US008732370B2

(12) United States Patent
Chirca et al.

(10) Patent No.: US 8,732,370 B2
(45) Date of Patent: May 20, 2014

(54) MULTILAYER ARBITRATION FOR ACCESS TO MULTIPLE DESTINATIONS

(75) Inventors: Kai Chirca, Richardson, TX (US);
Timothy D Anderson, Dallas, TX (US);
Amitabh Menon, Milpitas, CA (US)

(73) Assignee: Texas Instruments Incorporated, Dallas, TX (US)

( * ) Notice: Subject to any disclaimer, the term of this patent is extended or adjusted under 35 U.S.C. 154(b) by 245 days.

(21) Appl. No.: 13/212,384

(22) Filed: Aug. 18, 2011

(65) Prior Publication Data

US 2012/0072631 A1    Mar. 22, 2012

Related U.S. Application Data (60) Provisional application No. 61/384,932, filed on Sep. 21, 2010.

(51) Int. Cl.
G06F 13/14    (2006.01)

(52) U.S. Cl.
USPC .......................................... 710/243; 710/244

(58) Field of Classification Search
USPC ................................................ 710/243–244
See application file for complete search history.

(56) References Cited

U.S. PATENT DOCUMENTS

| 5,689,656 | A | * | 11/1997 | Baden et al. ................... 710/116 |
| 5,710,549 | A | * | 1/1998 | Horst et al. ..................... 710/40 |
| 6,032,232 | A | * | 2/2000 | Lindeborg et al. ............ 711/149 |
| 7,024,506 | B1 | * | 4/2006 | Harrington .................... 710/243 |
| 2004/0073733 | A1 | * | 4/2004 | LaBerge ........................ 710/117 |
| 2006/0026275 | A1 | * | 2/2006 | Gilmour et al. ............... 709/223 |
| 2011/0047411 | A1 | * | 2/2011 | Gille ................................. 714/8 |
| 2011/0103301 | A1 | * | 5/2011 | Mueck et al. .................. 370/328 |
| 2011/0296068 | A1 | * | 12/2011 | Fredenberg et al. .......... 710/120 |

OTHER PUBLICATIONS

"TMS320C6678 Multicore Fixed and Floating-Point Digital Signal Processor", Data Manual, SPRS691, Texas Instruments Incorporated, Nov. 2010, pp. 1-259.

* cited by examiner

*Primary Examiner* — Nimesh G Patel
(74) *Attorney, Agent, or Firm* — Robert D. Marshall, Jr.; W. James Brady; Frederick J. Telecky, Jr.

(57) ABSTRACT

An arbiter is provided for arbitrating for access to a shared resource by a plurality of requesters and by a background requester in a processing system. A priority value is assigned to each of the plurality of requestors. A multilayer arbitration contest is performed to resolve each conflict in transaction requests to the shared resource, however, a requester of the plurality of requesters having a highest priority value does not always win an arbitration contest. An arbitration contest will be overridden whenever the background requester initiates a transaction request, such that the background requester always wins the overridden arbitration contest. The shared resource is accessed by the winner of each arbitration contest.

8 Claims, 7 Drawing Sheets

MULTILAYER ARBITRATION FOR ACCESS TO MULTIPLE DESTINATIONS

CLAIM OF PRIORITY UNDER 35 U.S.C. 119(E)

The present application claims priority to and incorporates by reference U.S. Provisional Application No. 61/384,932, filed Sep. 21, 2010, entitled "Memory Protection Architecture."

FIELD OF THE INVENTION

This invention generally relates to management of memory access by multiple requesters, and in particular to access to a shared memory resource in a system on a chip with multiple cores.

BACKGROUND OF THE INVENTION

System on Chip (SoC) is a concept that strives to integrate more and more functionality into a given device. This integration can take the form of either hardware or solution software. Performance gains are traditionally achieved by increased clock rates and more advanced processor nodes. Many SoC designs pair a digital signal processor (DSP) with a reduced instruction set computing (RISC) processor to target specific applications. A more recent approach to increasing performance has been to create multi-core devices. In this scenario, management of competition for processing resources is typically resolved using a priority scheme.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

High performance computing has taken on even greater importance with the advent of the Internet and cloud computing. To ensure the responsiveness of networks, online processing nodes and storage systems must have extremely robust processing capabilities and exceedingly fast data-throughput rates. Robotics, medical imaging systems, visual inspection systems, electronic test equipment, and high-performance wireless and communication systems, for example, must be able to process an extremely large volume of data with a high degree of precision. A multi-core architecture that embodies an aspect of the present invention will be described herein. In a typically embodiment, a multi-core system is implemented as a single system on chip (SoC). As used herein, the term "core" refers to a processing module that may contain an instruction processor, such as a digital signal processor (DSP) or other type of microprocessor, along with one or more levels of cache that are tightly coupled to the processor.

In a multi core shared memory system, more than one core may request access to the same resource on a same cycle. A flexible arbitration scheme with the consideration of each core's priority request as well as fairness and bandwidth management is needed to give every core an even opportunity to access the limited resources. In addition, the total round-trip latency for servicing cache misses from the DSP cores has a profound effect on the performance of the cores. The arbitration scheme needs to be built such that it provides the lowest possible latency to the shared resource, while preserving the priority and fairness of the system.

Embodiments of the present invention solve the arbitration problem with a multi-layer arbitration scheme. An embodiment will be described herein that is a five-layer arbitration scheme. However, in other embodiments, there may be additional layers, or fewer layers while still providing for lowest possible latency to a shared resource, while preserving the priority and fairness of the system.

For RAM (random access memory) endpoint arbiters, there is a first layer of arbitration for internal error correction requests. The general concept of error detection and correction, or EDC, is known and therefore need not be described in detail herein. However, in this embodiment a scrubber periodically scans the memory and will be described in more detail below. These internally generated background scrubber requests receive special priority treatment to assure that they always win any arbitration contest.

When there has been no contention for a resource in the previous clock cycle, a second layer of arbitration implements a fixed priority arbitration scheme in order to give a quick result whenever contention first happens. In this case, the priority of transactions and fairness is not considered. This layer exists to reduce the overall time it takes to make a decision when the resource is not being "fought over" by multiple requestors. This layer reduces the overall latency of accesses under lightly loaded conditions.

When a resource starts seeing contention between multiple requestors, arbitration layers three through five are activated. The third layer arbitrates according to the priority level request as defined by each core. This is a strict priority scheme in which the highest priority transactions always win, unless another layer kicks in, as described below.

The forth layer arbitrates between requestors in the case where all the requests are at the same priority level. This level considers the win/lose history of all the cores to uniformly give all the requestors a fair chance at accessing the bank. This scheme has been shown to be fairer than a round-robin technique.

The fifth layer works in the background monitoring the wait time of each losing core. When a pre-set limit of wait cycles are reached, the corresponding core's priority will be boosted to the highest priority level and resubmitted for arbitration decision to layers three and four.

Figure 1:
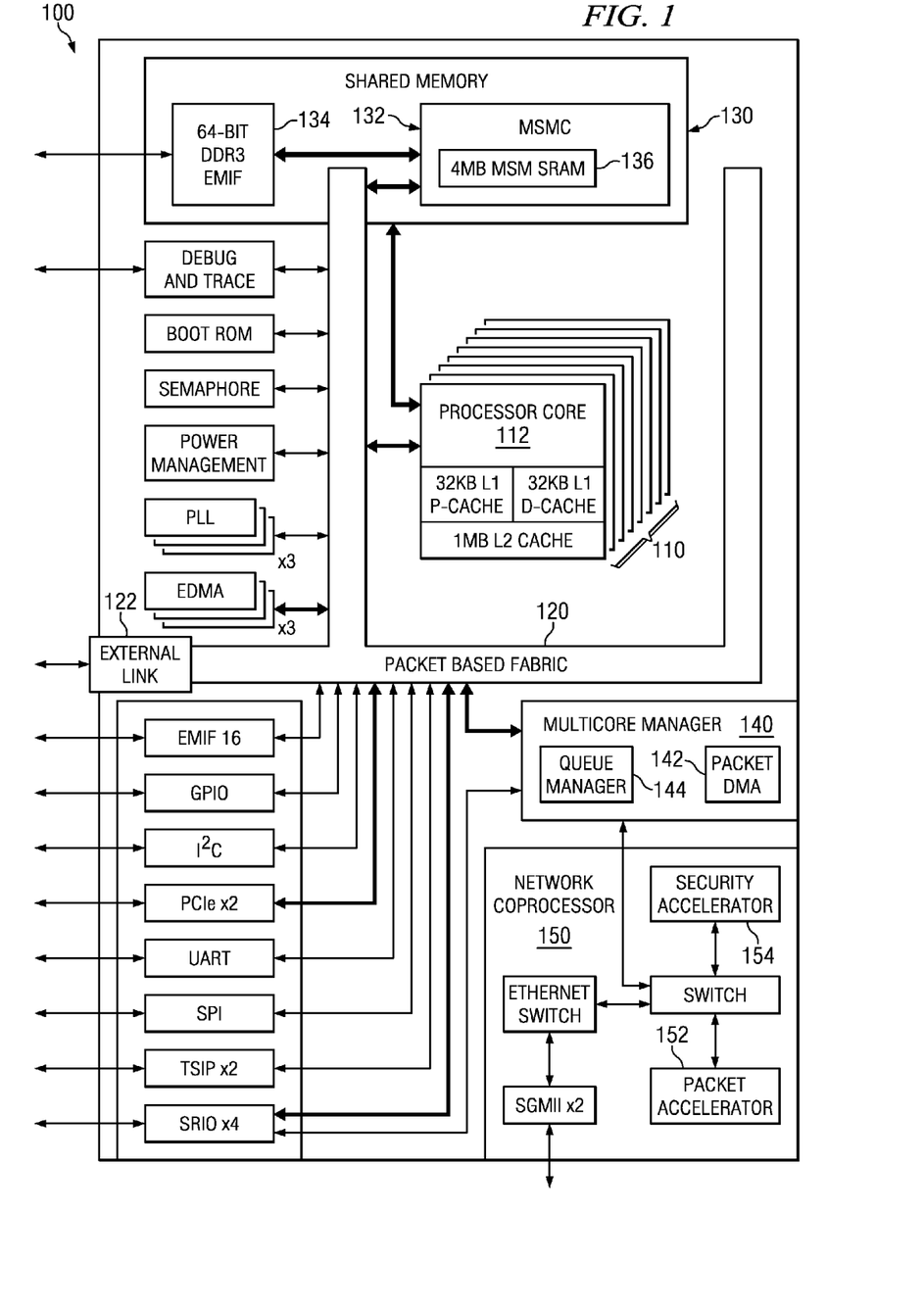
FIG. 1 is a functional block diagram of a system on chip (SoC) that includes an embodiment of the invention.

FIG. 1 is a functional block diagram of a system on chip (SoC) 100 that includes an embodiment of the invention. System 100 is a multi-core SoC that includes a set of processor modules 110 that each includes a processor core, level one (L1) data and instruction caches, and a level two (L2) cache. In this embodiment, there are eight processor modules 110; however other embodiments may have fewer or greater number of processor modules. In this embodiment, each processor core is a digital signal processor (DSP); however, in other embodiments other types of processor cores may be used. A packet-based fabric 120 provides high-speed non-blocking channels that deliver as much as 2 terabits per second of on-chip throughput. Fabric 120 interconnects with shared memory system 130 to provide an extensive two-layer memory structure in which data flows freely and effectively between processor modules 110, as will be described in more detail below. An example of SoC 100 is embodied in an SoC from Texas Instruments, and is described in more detail in "TMS320C6678—Multi-core Fixed and Floating-Point Signal Processor Data Manual", SPRS691, November 2010, which is incorporated by reference herein.

External link 122 provides direct chip-to-chip connectivity for local devices, and is also integral to the internal processing architecture of SoC 100. External link 122 is a fast and efficient interface with low protocol overhead and high throughput, running at an aggregate speed of 50 Gbps (four lanes at 12.5 Gbps each). Working in conjunction with a routing manager 140, link 122 transparently dispatches tasks to other local devices where they are executed as if they were being processed on local resources.

There are three levels of memory in the SoC 100. Each processor module 110 has its own level-1 program (DP) and level-1 data (L1D) memory. Additionally, each module 110 has a local level-2 unified memory (L2). Each of the local memories can be independently configured as memory-mapped SRAM (static random access memory), cache or a combination of the two.

In addition, SoC 100 includes shared memory 130, comprising internal and external memory connected through the multi-core shared memory controller (MSMC) 132. MSMC 132 allows processor modules 110 to dynamically share the internal and external memories for both program and data. The MSMC internal RAM offers flexibility to programmers by allowing portions to be configured as shared level-2 RAM (SL2) or shared level-3 RAM (SL3). SL2 RAM is cacheable only within the local DP and L1D caches, while SL3 is additionally cacheable in the local L2 caches.

External memory may be connected through the same memory controller 132 as the internal shared memory via external memory interface 134, rather than to chip system interconnect as has traditionally been done on embedded processor architectures, providing a fast path for software execution. In this embodiment, external memory may be treated as SL3 memory and therefore cacheable in L1 and L2.

SoC 100 may also include several co-processing accelerators that offload processing tasks from the processor cores in processor modules 110, thereby enabling sustained high application processing rates. SoC 100 may also contain an Ethernet media access controller (EMAC) network coprocessor block 150 that may include a packet accelerator 152 and a security accelerator 154 that work in tandem. The packet accelerator speeds the data flow throughout the core by transferring data to peripheral interfaces such as the Ethernet ports or Serial RapidIO (SRIO) without the involvement of any module 110's DSP processor. The security accelerator provides security processing for a number of popular encryption modes and algorithms, including IPSec, SCTP, SRTP, 3GPP, SSL/TLS and several others.

Multi-core manager 140 provides single-core simplicity to multi-core device SoC 100. Multi-core manager 140 provides hardware-assisted functional acceleration that utilizes a packet-based hardware subsystem. With an extensive series of more than 8,000 queues managed by queue manager 144 and a packet-aware DMA controller 142, it optimizes the packet-based communications of the on-chip cores by practically eliminating all copy operations.

The low latencies and zero interrupts ensured by multi-core manager 140, as well as its transparent operations, enable new and more effective programming models such as task dispatchers. Moreover, software development cycles may be shortened significantly by several features included in multi-core manager 140, such as dynamic software partitioning. Multi-core manager 140 provides "fire and forget" software tasking that may allow repetitive tasks to be defined only once, and thereafter be accessed automatically without additional coding efforts.

Two types of buses exist in SoC 100 as part of packet based switch fabric 120: data buses and configuration buses. Some peripherals have both a data bus and a configuration bus interface, while others only have one type of interface. Furthermore, the bus interface width and speed varies from peripheral to peripheral. Configuration buses are mainly used to access the register space of a peripheral and the data buses are used mainly for data transfers. However, in some cases, the configuration bus is also used to transfer data. Similarly, the data bus can also be used to access the register space of a peripheral. For example, DDR3 memory controller 134 registers are accessed through their data bus interface.

Processor modules 110, the enhanced direct memory access (EDMA) traffic controllers, and the various system peripherals can be classified into two categories: masters and slaves. Masters are capable of initiating read and write transfers in the system and do not rely on the EDMA for their data transfers. Slaves on the other hand rely on the EDMA to perform transfers to and from them. Examples of masters include the EDMA traffic controllers, serial rapid I/O (SRIO), and Ethernet media access controller 150. Examples of slaves include the serial peripheral interface (SPI), universal asynchronous receiver/transmitter (UART), and inter-integrated circuit (I2C) interface.

Figure 2:
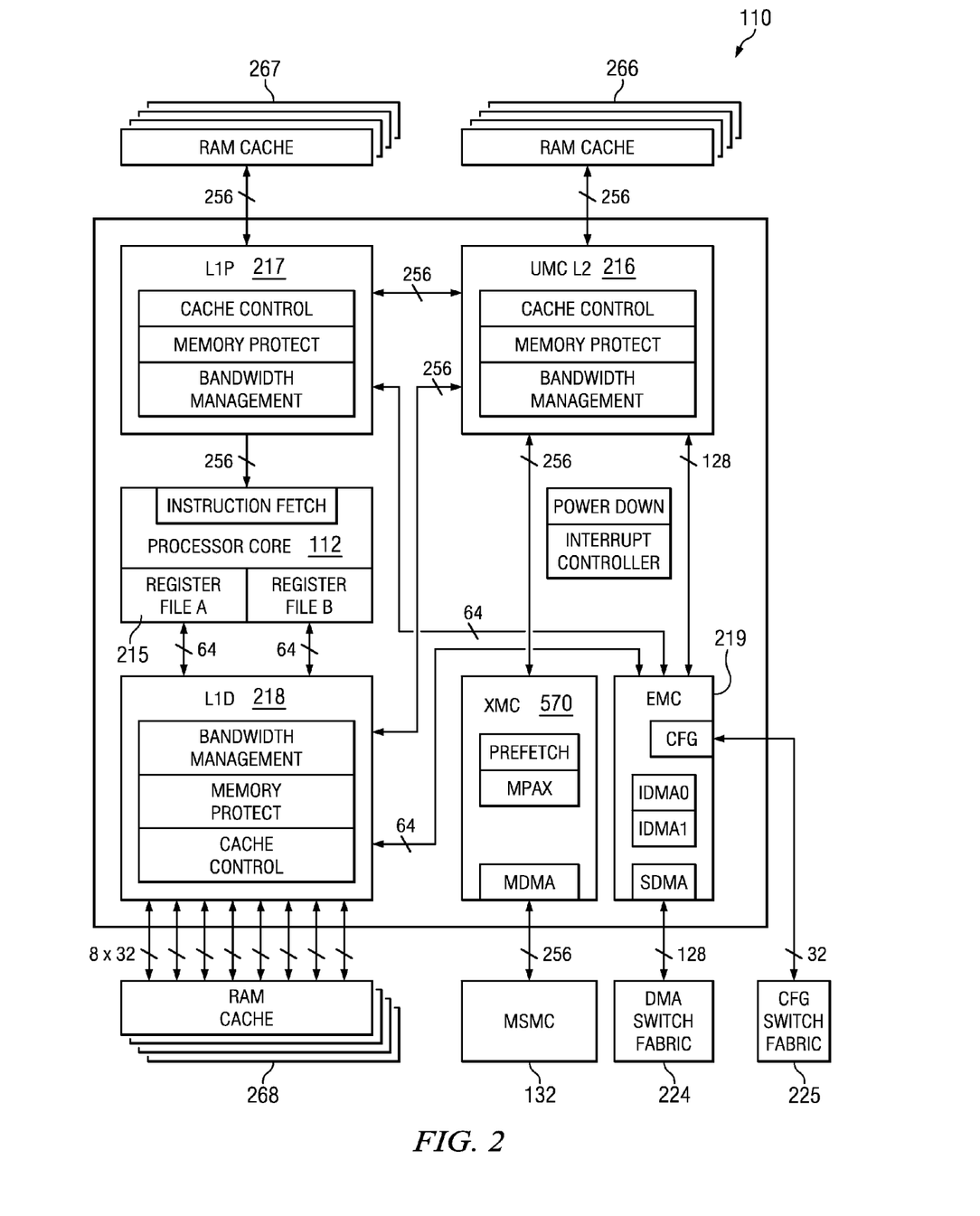
FIG. 2 is a more detailed block diagram of one processing module used in the SoC of FIG. 1.

FIG. 2 is a more detailed block diagram of one processing module 110 used in the SoC of FIG. 1. As mentioned above, SoC 100 contains two switch fabrics that form the packet based fabric 120 through which masters and slaves communicate. A data switch fabric 224, known as the data switched central resource (SCR), is a high-throughput interconnect mainly used to move data across the system. The data SCR is further divided into two smaller SCRs. One connects very high speed masters to slaves via 256-bit data buses running at a DSP/2 frequency. The other connects masters to slaves via 128-bit data buses running at a DSP/3 frequency. Peripherals that match the native bus width of the SCR it is coupled to can connect directly to the data SCR; other peripherals require a bridge.

A configuration switch fabric 225, also known as the configuration switch central resource (SCR), is mainly used to access peripheral device configuration registers (CFG). The configuration SCR connects the each processor module 110 and masters on the data switch fabric to slaves via 32-bit configuration buses running at a DSP/3 frequency. As with the data SCR, some peripherals require the use of a bridge to interface to the configuration SCR.

Bridges perform a variety of functions:
Conversion between configuration bus and data bus.
Width conversion between peripheral bus width and SCR bus width.
Frequency conversion between peripheral bus frequency and SCR bus frequency.

The priority level of all master peripheral traffic is defined at the boundary of switch fabric 120 where each master is coupled to the fabric. User programmable priority registers are present to allow software configuration of the data traffic through the switch fabric. In this embodiment, a lower number means higher priority. For example: PRI=000b=urgent, PRI=111b=low.

All other masters provide their priority directly and do not need a default priority setting. Examples include the processor module 110, whose priorities are set through software in a unified memory controller (UMC) 216 control registers. All the Packet DMA based peripherals also have internal registers to define the priority level of their initiated transactions.

DSP processor core 112 includes eight functional units (not shown), two register files 215, and two data paths. The two general-purpose register files 215 (A and B) each contain 32 32-bit registers for a total of 64 registers. The general-purpose registers can be used for data or can be data address pointers. The data types supported include packed 8-bit data, packed 16-bit data, 32-bit data, 40-bit data, and 64-bit data. Multiplies also support 128-bit data. 40-bit-long or 64-bit-long values are stored in register pairs, with the 32 LSBs of data placed in an even register and the remaining 8 or 32 MSBs in the next upper register (which is always an odd-numbered register). 128-bit data values are stored in register quadruplets, with the 32 LSBs of data placed in a register that is a multiple of 4 and the remaining 96 MSBs in the next 3 upper registers.

The eight functional units (.M1, .L1, .D1, .S1, .M2, .L2, .D2, and .S2) are each capable of executing one instruction every clock cycle. The .M functional units perform all multiply operations. The .S and .L units perform a general set of arithmetic, logical, and branch functions. The .D units primarily load data from memory to the register file and store results from the register file into memory. Each .M unit can perform one of the following fixed-point operations each clock cycle: four 32×32 bit multiplies, sixteen 16×16 bit multiplies, four 16×32 bit multiplies, four 8×8 bit multiplies, four 8×8 bit multiplies with add operations, and four 16×16 multiplies with add/subtract capabilities. There is also support for Galois field multiplication for 8-bit and 32-bit data. Many communications algorithms such as FFTs and modems require complex multiplication. Each .M unit can perform one 16×16 bit complex multiply with or without rounding capabilities, two 16×16 bit complex multiplies with rounding capability, and a 32×32 bit complex multiply with rounding capability. The .M unit can also perform two 16×16 bit and one 32×32 bit complex multiply instructions that multiply a complex number with a complex conjugate of another number with rounding capability.

Communication signal processing also requires an extensive use of matrix operations. Each .M unit is capable of multiplying a [1×2] complex vector by a [2×2] complex matrix per cycle with or without rounding capability. A version also exists allowing multiplication of the conjugate of a [1×2] vector with a [2×2] complex matrix. Each .M unit also includes IEEE floating-point multiplication operations, which includes one single-precision multiply each cycle and one double-precision multiply every 4 cycles. There is also a mixed-precision multiply that allows multiplication of a single-precision value by a double-precision value and an operation allowing multiplication of two single-precision numbers resulting in a double-precision number. Each .M unit can also perform one the following floating-point operations each clock cycle: one, two, or four single-precision multiplies or a complex single-precision multiply.

The .L and .S units support up to 64-bit operands. This allows for arithmetic, logical, and data packing instructions to allow parallel operations per cycle.

An MFENCE instruction is provided that will create a processor stall until the completion of all the processor-triggered memory transactions, including:
Cache line fills
Writes from L1D to L2 or from the processor module to MSMC and/or other system endpoints
Victim write backs
Block or global coherence operation
Cache mode changes
Outstanding XMC prefetch requests.

Each processor module 110 in this embodiment contains a 1024 KB level-2 memory (L2) 216, a 32 KB level-1 program memory (DP) 217, and a 32 KB level-1 data memory (L1D) 218. The device also contains a 4096 KB multi-core shared memory (MSM) 132. All memory in SoC 100 has a unique location in the memory map The L1P and L1D cache can be reconfigured via software through the L1PMODE field of the DP Configuration Register (L1PCFG) and the L1DMODE field of the L1D Configuration Register (L1DCFG) of each processor module 110 to be all SRAM, all cache memory, or various combinations. L1D is a two-way set-associative cache, while DP is a direct-mapped cache.

L2 memory can be configured as all SRAM, all 4-way set-associative cache, or a mix of the two. The amount of L2 memory that is configured as cache is controlled through the L2MODE field of the L2 Configuration Register (L2CFG) of each processor module 110.

Global addresses are accessible to all masters in the system. In addition, local memory can be accessed directly by the associated processor through aliased addresses, where the eight MSBs are masked to zero. The aliasing is handled within each processor module 110 and allows for common code to be run unmodified on multiple cores. For example, address location 0x10800000 is the global base address for processor module 0's L2 memory. DSP Core 0 can access this location by either using 0x10800000 or 0x00800000. Any other master in SoC 100 must use 0x10800000 only. Conversely, 0x00800000 can by used by any of the cores as their own L2 base addresses.

Level 1 program (DP) memory controller (PMC) 217 controls program cache memory 267 and includes memory protection and bandwidth management. Level 1 data (L1D) memory controller (DMC) 218 controls data cache memory 268 and includes memory protection and bandwidth management. Level 2 (L2) memory controller, unified memory controller (UMC) 216 controls L2 cache memory 266 and includes memory protection and bandwidth management. External memory controller (EMC) 219 includes Internal DMA (IDMA) and a slave DMA (SDMA) interface that is coupled to data switch fabric 224. The EMC is coupled to configuration switch fabric 225. Extended memory controller (XMC) is coupled to MSMC 132 and to dual data rate 3 (DDR3) external memory controller 134.

The priority level for operations initiated within the processor module 110 are declared through registers within each processor module 110. These operations are:
- DSP-initiated transfers
- User-programmed cache coherency operations
- IDMA-initiated transfers The priority level for operations initiated outside the processor modules 110 by system peripherals is declared through the Priority Allocation Register (PRI_ALLOC). System peripherals that are not associated with a field in PRI_ALLOC may have their own registers to program their priorities.

Figure 3:
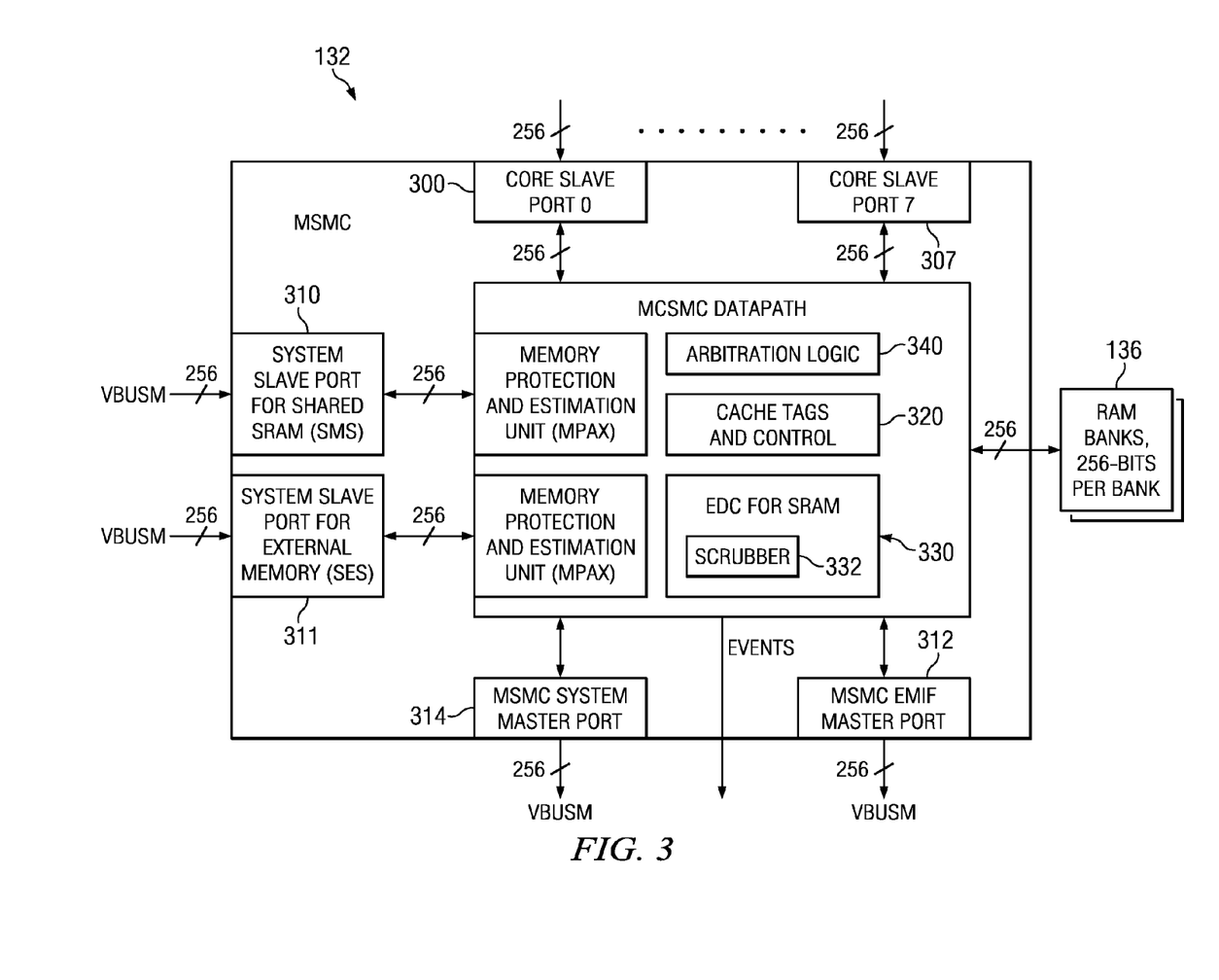
FIG. 3 is a block diagram illustrating a multi-core shared memory controller (MSMC) used in the SoC of FIG. 1.

FIG. 3 is a block diagram illustrating in more detail multi-core shared memory controller (MSMC) 132 used in SoC 100. The MSMC is a module designed to manage traffic between multiple processor cores, other mastering peripherals or DMA and the EMIF in a multi-core SoC. MSMC 132 provides a shared on-chip memory 136 that can be used either as a shared on-chip SRAM or a cache for external memory traffic by one or more of processor cores 110.

MSMC module 132 has eight processor core slave interfaces 300-307, one for each processor core 110; two full slave interfaces 310, 311 for connections to the SoC system interconnect 120; one master port 312 to connect to EMIF 134 and one master port to connect to the SoC infrastructure. Slave port 310 is for accesses from the packet switched interconnect 120 to on-chip shared memory 136, while slave port 311 is for accesses from the packet switched interconnect 120 to off-chip external memory via EMIF 134. In this embodiment, each port supports 256 bit data width. In other embodiments, there may be a larger or smaller number of cores 110 and corresponding processor core slave interfaces, or different width ports, for example.

Each of the slave interfaces may contain an elastic command buffer to hold one in-flight request when the interface is stalled due to loss of arbitration or an outstanding read data return. During that time, the other slave interfaces can continue to field accesses to endpoints that are not busy. The interface handles the transfer size that may be generated by the core modules, which in this embodiment is 1-32 or 64 bytes.

Cache tag and control logic 320 is used when a portion of on-chip shared RAM 136 is being used as a shared L3 cache.

Error detection and correction (EDC) logic 330 monitors shared memory 136 and provides error correction using parity bits. Shared memory 136 includes four banks with each bank having 256 bits. As parity is tracked at a granularity equal to the width of the banks (32 bytes), writes that are smaller than 32 bytes can invalidate the parity information for a line. When this happens, the parity bits for that line are marked as invalid. MSMC 132 contains a background error correction scrubbing engine hardware 332 that periodically refreshes the parity bits for the memory. MSMC scrubbing engine 332 is a state machine that periodically cycles through each location of each memory bank in the MSMC, reading and correcting the data, recalculating the parity bits for the data and storing the data and parity information.

Each such "scrubbing cycle" consists of a series of read-modify-write "scrub bursts" to the memory banks. Each read-modify-write of a location by the scrubbing engine needs to be atomically, that is, once the scrubbing engine wins arbitration for the bank, it needs uninterrupted access for the duration of the read and write back of a location. Hence, the accesses by the scrubbing engine are accorded the highest priority (next to cache victim reads) by the bank arbiter. A fully pipelined scrub burst sequence of 4-reads, 4-writes of four consecutive memory addresses is employed. This locks out each sub-bank for 8 cycles but results in better utilization of the bandwidth available at the banks. The frequency with which each scrubbing cycle is initiated and the delay between each burst by the scrubbing engine is programmed using a register.

When access requests arrive at the MSMC slave ports, more than one access may target the same endpoint and hence need to be arbitrated among using arbitration logic 340, which will be described in more detail with regard to FIG. 5.

Figure 4:
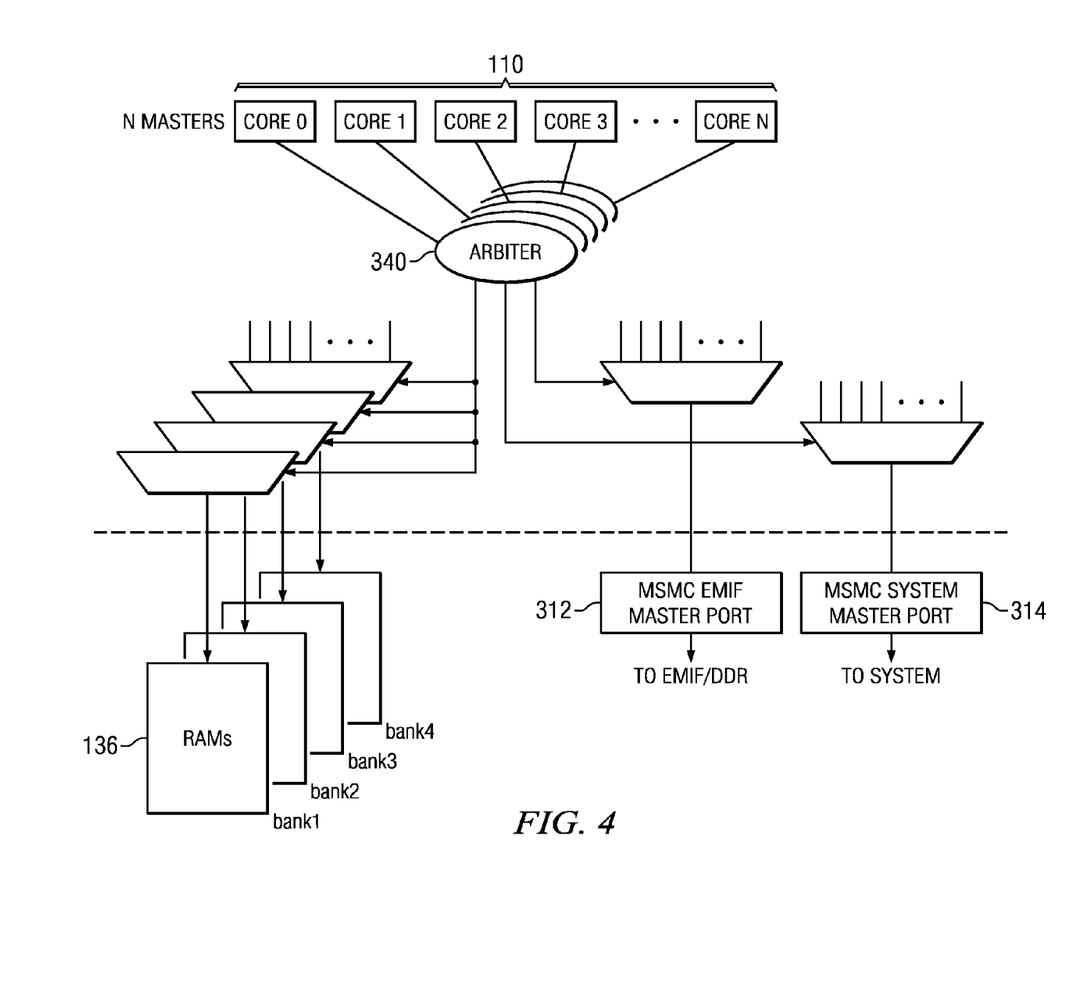
FIG. 4 is a block diagram illustrating arbitration between multiple requestors for shared resources in the MSMC.

FIG. 4 is a block diagram illustrating arbitration between multiple requestors for shared resources in the MSMC. Each endpoint in MSMC 132 has an associated arbiter; there is an arbiter for each memory bank 136 and one each for system master port 314 and EMIF master port 312. For each access to an endpoint, the arbitration logic utilizes a dynamic three-level priority scheme that attempts to fairly allocate the number of access opportunities and bandwidth among the requestors. This three-level priority scheme is referred to herein as fair-share arbitration. Each endpoint arbiter includes fair-share logic with additional logic specific to the requirements of that endpoint.

Each requesting slave interface is designed to present only one access request among all endpoint arbiters in a given cycle so that the return path for reads is reserved at the time a command wins arbitration.

Figure 5:
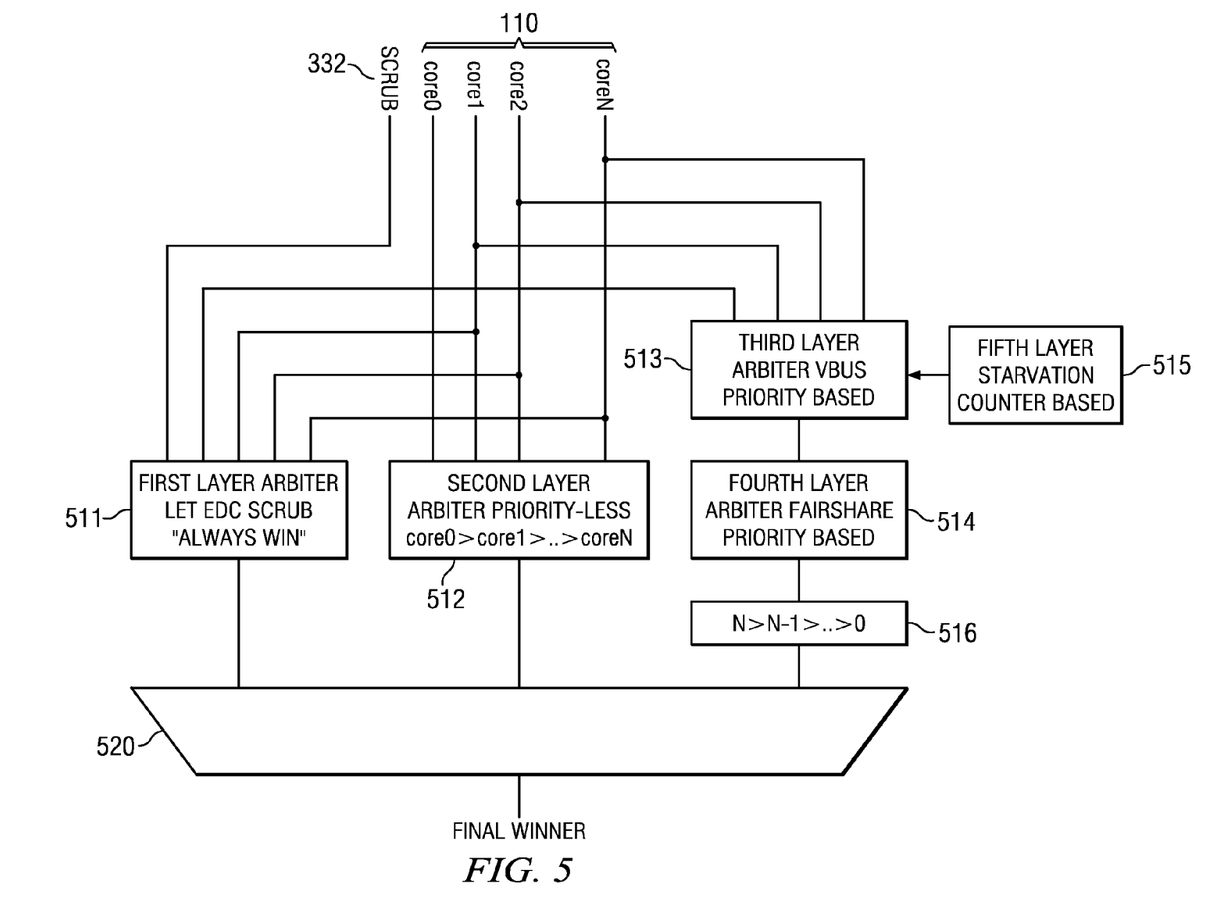
FIG. 5 is a more detailed block diagram of the arbitration module.

FIG. 5 is a more detailed block diagram of one copy of arbitration logic 500 used within arbitration module 340. There is one copy of arbitration logic 500 for each bank of shared memory 136. A similar copy is provided for each master port 312, 314, except scrub request 332 may be omitted. Each transaction includes a command part and a data part. Each transaction request command is assigned a priority value when it is issued. The arbitration priority level of a transaction is tracked in terms of a tuple <m,n> where m is the priority level specified in the transaction request command and n is the weighted age-based priority modifier (fair-share count) generated by the fair-share arbitration scheme that is tracked per requestor (slave port) in each arbiter. The fair-share counters for all requestors are initialized to 0 at reset.

There is a special requestor for RAM banks: the internal error detection and correction scrubbing controller 332 which periodically looks for and corrects soft errors in the SRAM. In a first layer of arbitration 511, scrubber request 332 always wins whenever the bank is available to accept the request. Therefore, when a scrubbing burst occurs, eight consecutive accesses are granted to it. No other requesters can gain access during these eight cycles except for the scrubbing controller. This behavior guarantees the atomic access request of data error detection and correction. These EDC requests will win over any other arbitration which is occurring, and all other arbitration determination counters are suspended in the other schemes. In a sense, the EDC request is treated as a "super-priority" request.

In order to provide the lowest possible latency, the arbiter is split into two parts. One part is a fixed priority-less arbitration, the other part is priority based fair-share arbitration. When there are no access conflicts to a bank on a preceding cycle and only one request arrives in a current cycle, then that request is given immediate access using arbitration layer 512. When there are no access conflicts to a bank on the preceding cycle but there are conflicts on the current cycle, the fixed priority-less arbitration layer 512 picks one request out of all conflicted requests to the same endpoint slave without regard to the transaction's assigned priority. This layer exists to reduce the amount of logic on the critical path (which determines the overall latency of the operation) in the case where there are no conflicts for the resource in question. However, in order to cover the case where the MSMC is going from a condition of no-conflicts on the bank, to having conflicts on the bank, a fixed priority-less scheme based on the enumerated value of each core is used in which core0 always will win, core1 is next, core2 after that, and so forth. Since each core is coupled to a dedicated slave port on MSMC 132, each slave port may be numbered and the slave port number used for the fixed priority-less arbitration layer.

Meanwhile, the rest of the unpicked requests get arbitrated according to their priority according to the fair-share arbitration scheme using layers 513-515. Due to the depth of the fair-share arbitration logic, the result of this part of the arbitration is registered and used in the next cycle and until all the conflicts are solved. As described earlier, the fair-share scheme attempts to fairly allocate the number of access opportunities and bandwidth among the requestors.

First of all, in each request is issued with a command priority which indicates the priority level of the corresponding command within the system relative to all other request commands to the same slave. In arbitration layer 513, the priority of each request command is taken into account during the arbitration to decide which core wins the access to the endpoint. The request with the highest priority level wins the arbitration. However, if two or more requests on a same cycle have the same priority value, then the win/lose history of each processor core 110 is used to make the decision in arbitration layer 514.

As mentioned earlier, the fair-share arbitration priority level of a transaction is tracked in terms of a tuple <m,n> where m is the priority level specified in the request command and n is the weighted age-based fair-share count. If there are N requesters to the same endpoint at the same cycle, the winner gains the access but its fair-share counter is reduced by N−1. Meanwhile, the N−1 cores that lost the arbitration increase their fair-share counter by 1, such that the sum of all the fair-share counters remains the same. Therefore, the history of how many delays the winning core caused to the entire system of all the other cores is recorded in each fair-share counter. Thus, the winning core then has to lose N−1 times before gaining its next access to the same endpoint. In other words, to win arbitration level 514, the request with the higher fair-share count value n is selected since they all had the same priority level m. When arbitration level 514 is not used, the fair-share counters remain the same.

However, if after comparing the fair-share priority, there is still a tie among two or more cores, another fixed priority-less layer 516 is used to break this tie. In this case, the second layer 512 core number order is reversed and the highest core number wins. In other words, coreN has the highest priority, then core N−1, all the way down to core 0 having the lowest priority.

The central arbiters for the memory banks and the EMIF master port may contain a starvation counter for each of the requestors being tracked as a fifth layer of arbitration 515. Starvation threshold registers are utilized for an application being executed on SoC 100 to set the maximum wait cycles per requestor, called the starvation threshold value. While a request is pending at the arbiter, the starvation counter for the corresponding requestor is decremented until it reaches zero. When the starvation counter reaches zero, the command priority of the request is elevated to zero, which is the highest priority level. If there are other requests pending at the highest priority level, the fair-share arbitration scheme is used to deal with all such requests at the same priority level.

Selector 520 picks the winner from the various layers based on the rules described above which allows the winning transaction request to proceed with accessing the shared resource.

In this manner, the multilayer arbitration scheme provides the lowest possible latency to the shared resource, while preserving the priority and fairness of the system. This scheme guarantees "always win" for the scrubbing controller to maintain the data error detection and correction function. Same cycle fixed priority-less arbitration saves an entire clock cycle of latency for an SRAM read, thereby reducing the access time for non-contention accesses. Request command priority based priority makes sure the system priority is followed. Fair-share based arbitration looks into the win/lose history of each core to give each core equal opportunity to gain the access to the resources. The starvation counter scheme makes sure the lower priority requests are still served according to their maximum wait cycles starvation threshold value instead of being totally ignored.

Figure 6:
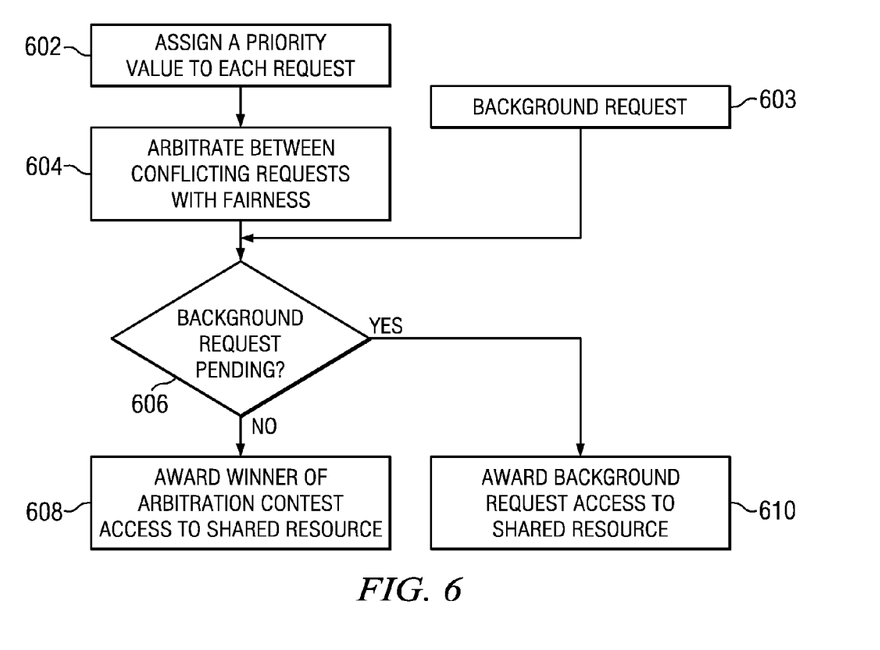
FIG. 6 is a flow diagram illustrating operation if the multilayer arbitration system used in the MSMC.

FIG. 6 is a flow diagram illustrating operation of the multilayer arbitration system used in MSMC 132, which provides a method for arbitrating for access to a shared resource by a plurality of requesters and by a background requester in a processing system. A priority value is assigned 602 to each of the plurality of requestors. As described in more detail above, the priority is assigned according to a priority level assigned to each processing module, coprocessor, DMA engine, and other type of module within the system that can request access to the shared resource. In many cases, the priority assigned for a particular requester may be changed by updating a register associated with the requester by an application program being executed by the system.

A background requester, such as EDC scrubber 332, periodically generates a background request 603 which has an implicit highest priority value.

A multilayer arbitration contest is performed 604 to resolve each conflict between transaction requests to the shared resource. In order to provide fair sharing of the accesses to the shared resource, a requester that has a highest priority value may not always win an arbitration contest.

An arbitration contest may be overridden 606 whenever the background requester initiates a transaction request 603. This allows the background requester to always win an arbitration contest.

Access to the shared resource is awarded 608 to the winner of each arbitration contest, unless the arbitration contest is overridden. When the background requester has a pending request, access to the shared resource is awarded 610 to the background requester.

Each of the requesters may also have an enumerated value, such as a physical location based number for each processing core. Each arbitration contest 604 may include performing a first layer arbitration contest with a portion of the plurality of requesters when contention did not occur on an immediate previous cycle using the enumerated value of the portion of requestors; and performing a second layer arbitration contest on a second portion of the plurality of requestors when contention did occur on an immediate previous cycle using the priority vales of the second portion of requesters.

In an arbitration contest 604, when the second portion of requesters all have a same priority value, then the multilayer arbitration contest may include performing a third layer arbitration contest by adjusting the priority of each of the second portion of requesters according to a win/lose history of each of the second portion of requesters.

In order to provide fairness, the arbitration contest 604 may maintain a starvation counter for each of the plurality of requesters by decrementing the respective starvation counter from an initial starvation threshold value each time one of the plurality of masters loses an arbitration contest. The priority value of a requester is increased when its respective starvation counter reaches zero. The multilayer arbitration contest 604 is then performed with the requester using the increased priority value.

System Example

Figure 7:
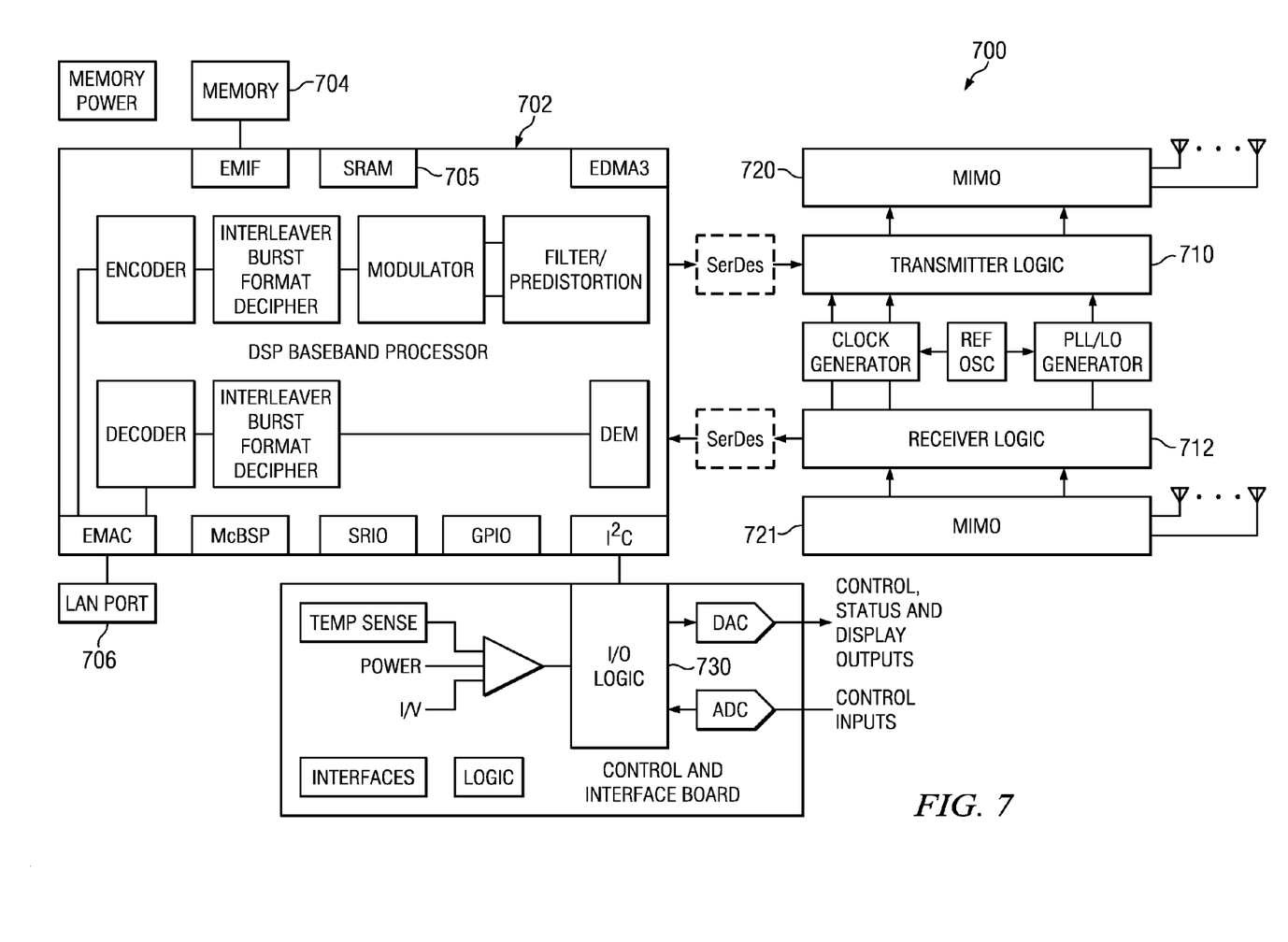
FIG. 7 is a block diagram of a system that includes the SoC of FIG. 1.

FIG. 7 is a block diagram of a base station for use in a radio network, such as a cell phone network. SoC 702 is similar to the SoC of FIG. 1 and is coupled to external memory 704 that may be used, in addition to the internal shared memory 705 within SoC 702, to store application programs and data being processed by SoC 702. Transmitter logic 710 performs digital to analog conversion of digital data streams transferred by the external DMA (EDMA3) controller and then performs modulation of a carrier signal from a phase locked loop generator (PLL). The modulated carrier is then coupled to multiple output antenna array 720. Receiver logic 712 receives radio signals from multiple input antenna array 721, amplifies them in a low noise amplifier and then converts them to digital a stream of data that is transferred to SoC 702 under control of external DMA EDMA3. There may be multiple copies of transmitter logic 710 and receiver logic 712 to support multiple antennas.

The Ethernet media access controller (EMAC) module in SoC 702 is coupled to a local area network port 706 which supplies data for transmission and transports received data to other systems that may be coupled to the internet.

An application program executed on one or more of the processor modules within SoC 702 encodes data received from the internet, interleaves it, modulates it and then filters and pre-distorts it to match the characteristics of the transmitter logic 710. Another application program executed on one or more of the processor modules within SoC 702 demodulates the digitized radio signal received from receiver logic 712, deciphers burst formats, and decodes the resulting digital data stream and then directs the recovered digital data stream to the internet via the EMAC internet interface. The details of digital transmission and reception are well known.

A multi-layer arbitration scheme within SoC 702, as described in more detail above, provides the lowest possible latency to the shared resources, such as off-chip memory 704 and on-chip memory 705, while preserving the priority and fairness of the system. In this manner, multiple channels of data can be received and transmitted using a single SoC 702 without dropping real-time information.

Input/output logic 730 may be coupled to SoC 702 via the inter-integrated circuit (I2C) interface to provide control, status, and display outputs to a user interface and to receive control inputs from the user interface. The user interface may include a human readable media such as a display screen, indicator lights, etc. It may include input devices such as a keyboard, pointing device, etc.

Other Embodiments

Although the invention finds particular application to Digital Signal Processors (DSPs), implemented, for example, in a System on a Chip (SoC), it also finds application to other forms of processors. A SoC may contain one or more megacells or modules which each include custom designed functional circuits combined with pre-designed functional circuits provided by a design library. MSMC may be a library module that is configurable to support two to eight processor cores, for example, and provide multi-layer arbitration according to the configured number of cores.

While the invention has been described with reference to illustrative embodiments, this description is not intended to be construed in a limiting sense. Various other embodiments of the invention will be apparent to persons skilled in the art upon reference to this description. For example, in another embodiment, the multilayer arbitration scheme may be applied internally to a processor core module to control access to shared resources within the core module. In another embodiment, some of the layers described herein may be left out, while other types of layers may be added.

In another embodiment, scrubbing may be performed on longer or shorter bursts. In another embodiment, the width and configuration of the memory being scrubbed may be different from that described herein, but still utilize scrubbing to periodically inspect the contents of memory.

In another embodiment, another type of periodic system function may be accorded super-priority status providing it unimpeded access to a critical system resource. For example, the system function may be a heart-beat function that must access a shared resource to assure the system is still functioning, otherwise it will signal an alarm. Other types of critical system functions now known or later developed may benefit from a multilayered arbitration scheme as described herein.

In another embodiment, the shared resource may be just a memory that is not part of a cache. The shared resource may by any type of storage device or functional device that may be accessed by multiple masters for which access needs to be arbitrated.

In another embodiment, there may be more or fewer master ports. There may be additional shared resources with an additional copy of the arbitration logic for each resource.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for arbitrating for access to a shared resource by a plurality of requesters and by a background requester in a processing system, the method comprising:
assigning a priority value to each of the plurality of requestors;
performing a multilayer arbitration contest to resolve each conflict between transaction requests to the shared resource, wherein a requester of the plurality of requesters having a highest priority value does not always win an arbitration contest including
performing a first layer arbitration contest among a plurality of current requesters when contention did not occur on an immediate previous cycle by selecting a winner based upon rank of the current requesters within a first fixed order of the plurality of requesters unrelated to respective assigned priority values, and
performing a second layer arbitration contest among a plurality of current requesters when contention did occur on an immediate previous cycle by selecting a winner having the highest assigned priority values of the current requesters; and
accessing the shared resource by the winner of each arbitration contest.

2. The method of claim 1, wherein:
said step of performing the multilayer arbitration contest further comprises
performing a third layer arbitration contest when contention did occur on an immediate previous cycle and a plurality of the current requesters have the same highest assigned priority value by selecting a winner from among the current requesters having the same highest assigned priority value according to a win/lose history count of each of the current requesters having the same highest assigned priority value.

3. The method of claim 2, further wherein:
said step of performing a multilayer arbitration contest further includes
updating the win/loss history count of each current requestor upon each arbitration contest by subtracting from the win/loss history count of the winning requestor a number equal to a number of losing current requesters and by adding one to the win/loss history count of losing current requesters whereby the total of all win/loss history counts is constant.

4. The method of claim 2, wherein:
said step of performing a multilayer arbitration contest further includes
performing a fourth layer arbitration contest when contention did occur on an immediate previous cycle and a plurality of the current requesters have both the same highest assigned priority value and the same win/loss history count by selecting a winner from among the current requesters having both the same highest assigned priority value and the same win/loss history count based upon rank of the current requestors within a second fixed order of the plurality of requesters opposite to the first fixed order of the plurality of requesters.

5. A system comprising:
a shared resource;
a plurality of master devices coupled to access the shared resource; wherein each master device provides a priority value along with an access request;
an arbiter coupled to the plurality of master devices, wherein the arbiter is configured to perform an arbitration contest and to award the winner of the arbitration contest access to the shared resource, said arbitration contest including
a first layer arbitration contest among a plurality of current requesters when contention did not occur on an immediate previous cycle selecting a winner based upon rank of the current requesters within a first fixed order of the plurality of requesters unrelated to respective provided priority values, and
a second layer arbitration contest among a plurality of current requesters when contention did occur on an immediate previous cycle selecting a winner having the highest assigned priority values of the current requesters.

6. The system of claim 5, further comprising:
a win/lose history counter for each of the plurality of master devices; and
said arbiter wherein said arbitration contest further includes
a third layer arbitration contest when contention did occur on an immediate previous cycle and a plurality of the current requesters have the same highest assigned priority value selecting a winner from among the current requesters having the same highest assigned priority value according to the win/lose history of each of the current requesters having the same highest assigned priority value.

7. The system of claim 6, wherein:
said arbiter wherein the arbitration contest further includes
updating the win/loss history counter of each current requestor upon each arbitration contest by subtracting from the win/loss history counter of the winning requestor a number equal to a number of losing current requesters and by adding one to the win/loss history counter of losing current requesters whereby the total of all counts of the win/loss history counters is constant.

8. The system of claim 6, further wherein:
said arbiter wherein the arbitration contest further includes
a fourth layer arbitration contest when contention did occur on an immediate previous cycle, a plurality of the current requesters have both the same highest assigned priority value and the same win/loss history count by selecting a winner from among the current requesters having both the same highest assigned priority value and the same win/loss history count based upon rank of the current requesters within a second fixed order of the plurality of requesters opposite to the first fixed order of the plurality of requesters.

* * * * *